(12) United States Patent
Pallerla et al.

(10) Patent No.: US 11,900,710 B1
(45) Date of Patent: Feb. 13, 2024

(54) PERSONALIZED FINGERPRINT SENSOR SYSTEM PARAMETERS

(71) Applicant: QUALCOMM Incorporated, San Diego, CA (US)

(72) Inventors: Rakesh Pallerla, Hyderabad (IN); Chandrika Singasani, Secunderabad (IN); Kritpal Singh Dhindhsa, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/161,785

(22) Filed: Jan. 30, 2023

(51) Int. Cl.
*G06V 40/13* (2022.01)
*G06F 3/0488* (2022.01)
*G06V 40/50* (2022.01)

(52) U.S. Cl.
CPC ............ *G06V 40/13* (2022.01); *G06F 3/0488* (2013.01); *G06V 40/50* (2022.01)

(58) Field of Classification Search
CPC .......... G06V 40/50; G06V 40/12–1394; G06F 3/0488
See application file for complete search history.

(56) References Cited

U.S. PATENT DOCUMENTS

| | | | |
|---|---|---|---|
| 2007/0003110 A1* | 1/2007 | Gutta | G06V 40/12 704/E17.014 |
| 2012/0016798 A1* | 1/2012 | Carper | G06Q 20/1085 340/5.83 |
| 2016/0078274 A1* | 3/2016 | Tuneld | G06V 10/993 382/124 |
| 2016/0350573 A1* | 12/2016 | Kitchens, II | G06F 18/251 |
| 2017/0075700 A1* | 3/2017 | Abudi | G06F 3/0484 |
| 2019/0370518 A1* | 12/2019 | Maor | A61B 8/02 |
| 2022/0004728 A1* | 1/2022 | Strohmann | G06V 40/1306 |

* cited by examiner

*Primary Examiner* — Premal R Patel
(74) *Attorney, Agent, or Firm* — QUALCOMM Incorporated

(57) ABSTRACT

Some disclosed methods involve controlling a fingerprint sensor system to scan a portion of a user's digit on a surface of an apparatus using a plurality of trial fingerprint sensor system parameters and selecting, from among the trial fingerprint sensor system parameters, one or more personalized fingerprint sensor system parameters for inclusion in a set of personalized fingerprint sensor system parameters. Some disclosed methods involve selecting, based on the one or more personalized fingerprint sensor system parameters, an existing fingerprint sensor system parameter data structure that includes a set of existing fingerprint sensor system parameters, obtaining additional fingerprint sensor system parameters from the set of existing fingerprint sensor system parameters for inclusion in the set of personalized fingerprint sensor system parameters, and storing the set of personalized fingerprint sensor system parameters for future scans of the fingerprint sensor system.

20 Claims, 9 Drawing Sheets

PERSONALIZED FINGERPRINT SENSOR SYSTEM PARAMETERS

TECHNICAL FIELD

This disclosure relates generally to fingerprint sensor systems and related methods.

DESCRIPTION OF THE RELATED TECHNOLOGY

Biometric authentication can be an important feature for controlling access to devices, etc. Many existing products include some type of biometric authentication, including but not limited to fingerprint-based authentication. Although some existing fingerprint-based authentication methods and devices can provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a fingerprint sensor system and a control system configured for communication with the fingerprint sensor system. The fingerprint sensor system may be, or may include, an ultrasonic fingerprint sensor system. In some implementations, a mobile device (such as a wearable device, a cellular telephone, etc.) may be, or may include, at least part of the apparatus.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to control the fingerprint sensor system to scan a portion of a user's digit on a surface of the apparatus using a plurality of trial fingerprint sensor system parameters; select, from among the trial fingerprint sensor system parameters, one or more personalized fingerprint sensor system parameters for inclusion in a set of personalized fingerprint sensor system parameters; select, based on the one or more personalized fingerprint sensor system parameters, an existing fingerprint sensor system parameter data structure that includes a set of existing fingerprint sensor system parameters; obtain additional fingerprint sensor system parameters from the set of existing fingerprint sensor system parameters for inclusion in the set of personalized fingerprint sensor system parameters; and store the set of personalized fingerprint sensor system parameters for future scans of the fingerprint sensor system.

In some examples, the control system may be configured to scan the portion of the user's digit using the plurality of trial fingerprint sensor system parameters responsive to fingerprint sensor system performance that is at or below a fingerprint sensor system performance threshold. According to some examples, the fingerprint sensor system performance threshold may correspond to a false rejection rate threshold. In some examples, the fingerprint sensor system performance threshold may correspond to an image quality threshold or a signal-to-noise ratio threshold. According to some examples, the control system may be configured to scan the portion of the user's digit using the plurality of trial fingerprint sensor system parameters responsive to user input.

In some examples, the apparatus may include a display system. In some such examples, the user input may be received via a graphical user interface (GUI) presented on the display system. According to some examples, the control system may be further configured to present the GUI responsive to fingerprint sensor system performance that is at or below a fingerprint sensor system performance threshold. In some examples, the GUI may correspond to an apparatus settings application.

According to some examples, the control system may be configured to scan the portion of the user's digit using the plurality of trial fingerprint sensor system parameters responsive to unsatisfactory fingerprint sensor system performance using fingerprint sensor system parameters of the existing fingerprint sensor system parameter data structure. In some examples, the control system may be configured to scan the portion of the user's digit using the plurality of trial fingerprint sensor system parameters responsive to unsatisfactory fingerprint sensor system performance using fingerprint sensor system parameters of a plurality of existing fingerprint sensor system parameter data structures.

In some examples, the one or more personalized fingerprint sensor system parameters may include a peak frequency, a range gate delay, or both the peak frequency and the range gate delay. According to some examples, the control system may be configured to select the one or more personalized fingerprint sensor system parameters based, at least in part, on image quality, signal-to-noise ratio, or a combination thereof. In some examples, the existing fingerprint sensor system parameter data structure may be selected from a plurality of existing fingerprint sensor system parameter data structures. According to some examples, the existing fingerprint sensor system parameter data structure may be selected from the plurality of existing fingerprint sensor system parameter data structures according to a distance between the one or more personalized fingerprint sensor system parameters and one or more corresponding fingerprint sensor system parameters of each existing fingerprint sensor system parameter data structure of the plurality of existing fingerprint sensor system parameter data structures. According to some examples, the control system may be configured to obtain one or more background images prior to selecting the one or more personalized fingerprint sensor system parameters.

Other innovative aspects of the subject matter described in this disclosure may be implemented in a method. In some examples, the method may involve controlling, by a control system, a fingerprint sensor system to scan a portion of a user's digit on a surface of an apparatus using a plurality of trial fingerprint sensor system parameters; selecting, by the control system and from among the trial fingerprint sensor system parameters, one or more personalized fingerprint sensor system parameters for inclusion in a set of personalized fingerprint sensor system parameters; selecting, by the control system and based on the one or more personalized fingerprint sensor system parameters, an existing fingerprint sensor system parameter data structure that includes a set of existing fingerprint sensor system parameters; obtaining, by the control system, additional fingerprint sensor system parameters from the set of existing fingerprint sensor system parameters for inclusion in the set of personalized fingerprint sensor system parameters; and storing by the control system, the set of personalized fingerprint sensor system parameters for future scans of the fingerprint sensor system.

According to some examples, the method may involve scanning the portion of the user's digit using the plurality of trial fingerprint sensor system parameters responsive to fingerprint sensor system performance that is at or below a fingerprint sensor system performance threshold. In some examples, the fingerprint sensor system performance threshold may correspond to a false rejection rate threshold. According to some examples, the fingerprint sensor system performance threshold may correspond to an image quality threshold or a signal-to-noise ratio threshold.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. In some examples, the method may involve controlling, by a control system, a fingerprint sensor system to scan a portion of a user's digit on a surface of an apparatus using a plurality of trial fingerprint sensor system parameters; selecting, by the control system and from among the trial fingerprint sensor system parameters, one or more personalized fingerprint sensor system parameters for inclusion in a set of personalized fingerprint sensor system parameters; selecting, by the control system and based on the one or more personalized fingerprint sensor system parameters, an existing fingerprint sensor system parameter data structure that includes a set of existing fingerprint sensor system parameters; obtaining, by the control system, additional fingerprint sensor system parameters from the set of existing fingerprint sensor system parameters for inclusion in the set of personalized fingerprint sensor system parameters; and storing by the control system, the set of personalized fingerprint sensor system parameters for future scans of the fingerprint sensor system.

According to some examples, the method may involve scanning the portion of the user's digit using the plurality of trial fingerprint sensor system parameters responsive to fingerprint sensor system performance that is at or below a fingerprint sensor system performance threshold. In some examples, the fingerprint sensor system performance threshold may correspond to a false rejection rate threshold. According to some examples, the fingerprint sensor system performance threshold may correspond to an image quality threshold or a signal-to-noise ratio threshold.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
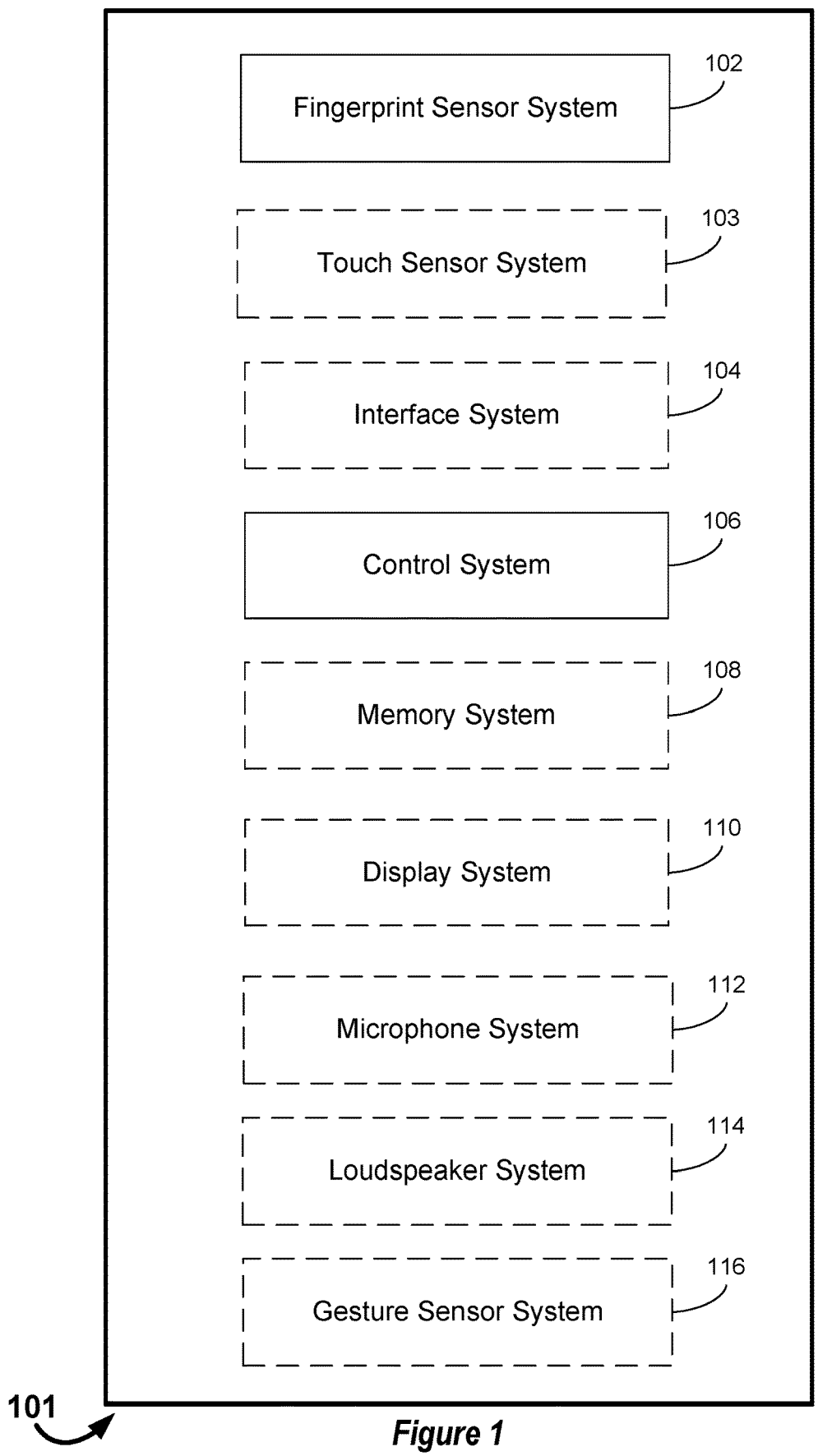
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Mobile devices, such as cell phones, are used for multiple tasks and have become a part of everyday life. Using a protective film to protect a display, for example a cell phone display, has also become common. However, having a protective film on the display can impact under-display fingerprint sensor performance. Moreover, different films have different properties, so the effect on under-display fingerprint sensor performance may vary from one protective film to another.

A previously-deployed solution to this problem involves a fixed number of protective films that are marketed as "supported." Fingerprint sensor system parameters that are suitable for devices that include supported protective films may be hard-coded and stored in a data structure, such as a look-up table (LUT). Accordingly, fingerprint sensor system parameters are only provided for a few protective films, not for all of the protective films present in the market. Moreover, fingerprint sensor system parameters that would normally be appropriate for a protective film may not be optimal for dry fingers, for low temperatures, or for other conditions. (The word "finger" as used herein may correspond to any digit, including a thumb. Accordingly, as used herein, a thumbprint is a type of fingerprint.)

Some disclosed methods involve controlling a fingerprint sensor system to scan at least a portion of a user's digit using various trial fingerprint sensor system parameters, then selecting one or more personalized fingerprint sensor system parameters from among the trial fingerprint sensor system parameters. The one or more personalized fingerprint sensor system parameters may be included in a set of personalized fingerprint sensor system parameters. According to some examples, an existing fingerprint sensor system parameter data structure, which includes a set of existing fingerprint sensor system parameters, may be selected. In some examples, the set of existing fingerprint sensor system parameters may correspond to a supported protective film. According to some examples, the existing fingerprint sensor system parameter data structure may be selected according to a distance between the one or more selected and personalized fingerprint sensor system parameters and one or more corresponding fingerprint sensor system parameters of the existing fingerprint sensor system parameter data structure. In other words, the "closest" existing fingerprint sensor system parameters to the one or more personalized fingerprint sensor system parameters may be selected in some instances. The existing fingerprint sensor system parameter data structure may include additional fingerprint sensor system parameters, as compared to the one or more personalized fingerprint sensor system parameters. These additional fingerprint sensor system parameters may be stored, along with the one or more personalized fingerprint sensor system parameters, for future scans of the fingerprint sensor system.

Particular implementations of the subject matter described in this disclosure may be implemented to realize one or more of the following potential advantages. Some disclosed methods can improve the image quality of fingerprint sensor data for both normal and dry finger conditions. According to some examples, the false rejection rate (FRR) may be reduced for all conditions, including normal and dry finger conditions. In such examples, less power is wasted because the fingerprint sensor system does not need to perform as many scans, due to the reduction in FRR. Performing relatively fewer scans also may prolong the useful lifetime of a fingerprint sensor system. The reduction in FRR also improves the user experience.

FIG. 1 is a block diagram that shows example components of an apparatus according to some disclosed implementations. In this example, the apparatus 101 includes a fingerprint sensor system 102 and a control system 106. Some implementations may include a touch sensor system 103, an interface system 104, a memory system 108, a display system 110, a microphone system 112, a loudspeaker system 114, a gesture sensor system 116, or combinations thereof.

According to some examples, the fingerprint sensor system 102 may be, or may include, an ultrasonic fingerprint sensor system. Alternatively, or additionally, in some implementations the fingerprint sensor system 102 may be, or may include, another type of fingerprint sensor, such as an optical fingerprint sensor, a capacitive fingerprint sensor, a thermal fingerprint sensor, etc. In some examples, an ultrasonic version of the fingerprint sensor system 102 may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor system 102 may sometimes be referred to herein as "fingerprint sensor data," "fingerprint image data," etc., whether or not the received data corresponds to an actual digit or another object from which the fingerprint sensor system 102 has received data. Such data will generally be received from the fingerprint sensor system in the form of electrical signals. Accordingly, without additional processing such image data would not necessarily be perceivable by a human being as an image. As noted elsewhere herein, the word "finger" as used herein may correspond to any digit, including a thumb. Accordingly, a thumbprint is a type of fingerprint.

The optional touch sensor system 103 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

In some examples, the interface system 104 may include a wireless interface system. In some implementations, the interface system 104 may include a user interface system, one or more network interfaces, one or more interfaces between the control system 106 and the fingerprint sensor system 102, one or more interfaces between the control system 106 and the touch sensor system 103, one or more interfaces between the control system 106 and the memory system 108, one or more interfaces between the control system 106 and the display system 110, one or more interfaces between the control system 106 and the microphone system 112, one or more interfaces between the control system 106 and the loudspeaker system 114, one or more interfaces between the control system 106 and the gesture sensor system 116 and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the fingerprint sensor system 102. According to some such examples, the interface system 104 may couple at least a portion of the control system 106 to the fingerprint sensor system 102 and the interface system 104 may couple at least a portion of the control system 106 to the touch sensor system 103, e.g., via electrically conducting material (e.g., via conductive metal wires or traces. According to some examples, the interface system 104 may be configured to provide communication between the apparatus 101 and other devices and/or human beings. In some such examples, the display system 110, the microphone system 112, the loudspeaker system 114, the gesture sensor system 116, or combinations thereof may be considered to be components of the interface system 104, even though these components are shown as separate blocks in FIG. 2. In some examples, the interface system 104 may include one or more user interfaces, haptic feedback devices, etc. The interface system 104 may, in some examples, include one or more network interfaces and/or one or more external device interfaces (such as one or more universal serial bus (USB) interfaces or a serial peripheral interface (SPI)).

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the fingerprint sensor system 102. In implementations wherein the apparatus includes a touch sensor system 103, the control system 106 may be configured for communication with, and for controlling, the touch sensor system 103. In implementations wherein the apparatus includes a memory system 108 that is separate from the control system 106, the control system 106 also may be configured for communication with the memory system 108. In implementations wherein the apparatus includes a display system 110, the control system 106 may be configured for communication with, and for controlling, the display system 110. In implementations wherein the apparatus includes a microphone system 112, the control system 106 may be configured for communication with, and for controlling, the microphone system 112. In implementations wherein the apparatus includes an loudspeaker system 114, the control system 106 may be configured for communication with, and for controlling, the loudspeaker system 114. According to some examples, the control system 106 may include one or more dedicated components that are configured for controlling the fingerprint sensor system 102, the touch sensor system 103, the memory system 108, the display system 110, the microphone system 112 and/or the loudspeaker system 114.

Accordingly, some examples of the apparatus 101 may include dedicated components that are configured for controlling at least a portion of the fingerprint sensor system 102, for processing fingerprint image data received from the fingerprint sensor system 102, or combinations thereof. Although the control system 106 and the fingerprint sensor system 102 are shown as separate components in FIG. 1, in some implementations at least a portion of the control system 106 and at least a portion of the fingerprint sensor system 102 may be co-located. For example, in some implementations one or more components of the fingerprint sensor system 102 may reside on an integrated circuit or "chip" of the control system 106. According to some implementations, functionality of the control system 106 may be partitioned between one or more controllers or processors, such as between a dedicated sensor controller and an applications processor (also referred to herein as a "host" processor) of an apparatus, such as a host processor of a mobile device. In some such implementations, at least a portion of the host processor may be configured for fingerprint image data processing, determination of whether currently-acquired fingerprint image data matches previously-obtained fingerprint image data (such as fingerprint image data obtained during an enrollment process), etc.

In some examples, the memory system 108 may include one or more memory devices, such as one or more RAM devices, ROM devices, etc. In some implementations, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In some examples, the apparatus 101 includes a display system 110, which may include one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones, one or more types of microphones, or combinations thereof.

According to some implementations, the apparatus 101 may include an loudspeaker system 114. The loudspeaker system 114 may include one or more loudspeakers, one or more types of loudspeakers, or combinations thereof.

In some implementations, the apparatus 101 may include a gesture sensor system 116. The gesture sensor system 116 may be, or may include, an ultrasonic gesture sensor system, an optical gesture sensor system or any other suitable type of gesture sensor system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, a watch, an armband, a wristband, a ring, a headband, an earbud or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2:
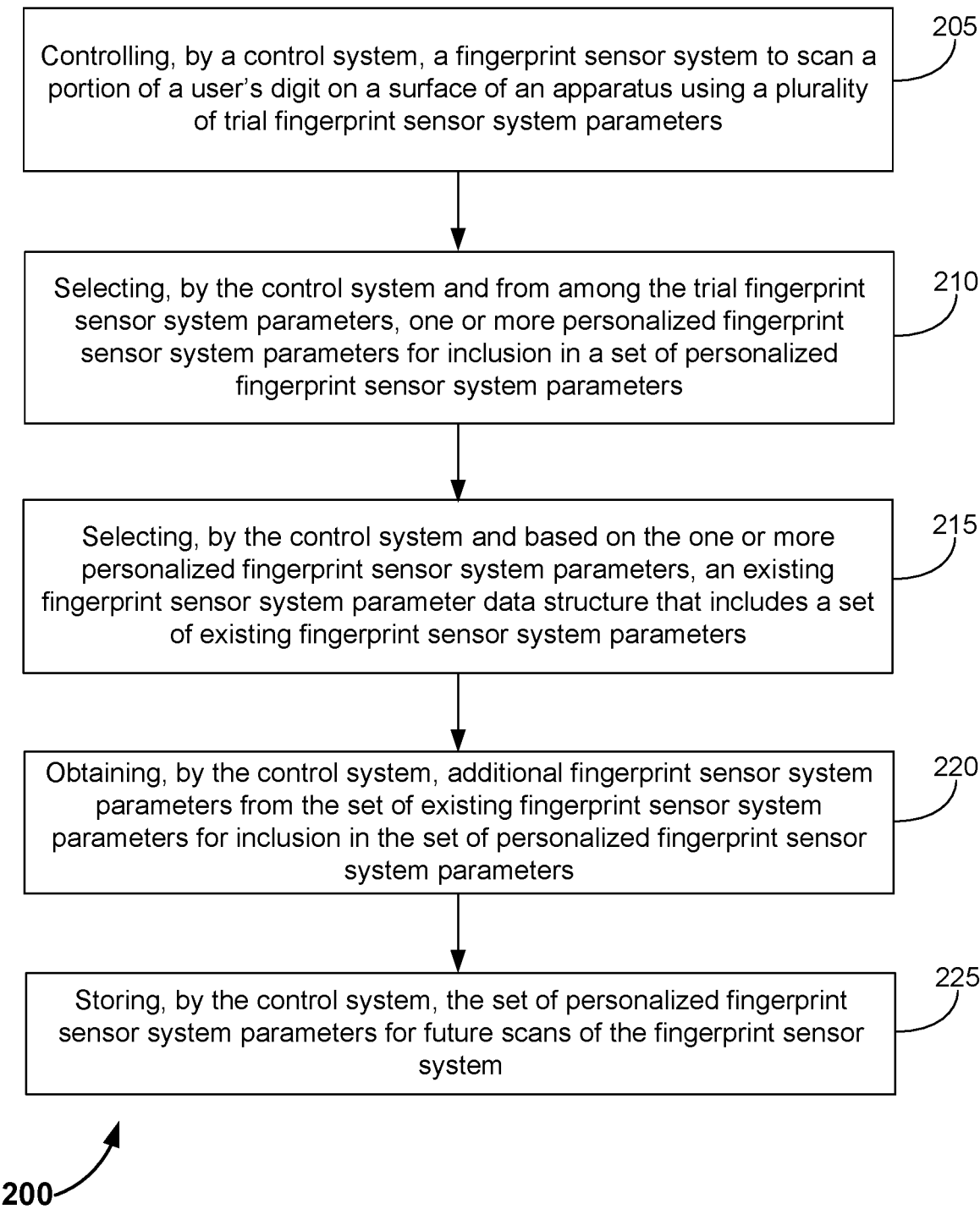
FIG. 2 is a flow diagram that presents examples of operations according to some disclosed methods.

FIG. 2 is a flow diagram that presents examples of operations according to some disclosed methods. The blocks of FIG. 2 may be performed by an apparatus that includes at least a fingerprint sensor system and a control system. The blocks of FIG. 2 may, for example, be performed by the apparatus 101 of FIG. 1 or by a similar apparatus. For example, in some implementations the control system 106 of FIG. 1 may be configured to perform, at least in part, the operations that are described herein with reference to FIG. 2. In some examples, the apparatus may be a mobile device, such as a cellular telephone. However, in other examples, the apparatus may be another type of device, such as a tablet, a laptop, an automobile or component thereof, a wearable device, etc. As with other methods disclosed herein, the methods outlined in FIG. 2 may include more or fewer blocks than indicated. Moreover, the blocks of methods disclosed herein are not necessarily performed in the order indicated. In some implementations, one or more blocks may be performed concurrently.

According to this example, method 200 is a method of controlling a fingerprint sensor system. In this example, block 205 involves controlling, by a control system, a fingerprint sensor system to scan a portion of a user's digit using a plurality of trial fingerprint sensor system parameters. In this example, the digit is on a surface of an apparatus that includes the fingerprint sensor system.

According to some examples, the fingerprint sensor system may be, or may include, an ultrasonic fingerprint sensor system. In some such examples, the trial fingerprint sensor system parameters may include one or more frequency parameters, such as a peak frequency used for a fingerprint sensor system scan. According to some such examples, the trial fingerprint sensor system parameters may include multiple peak frequencies ranging from 8 MHz to 14 MHz. Alternatively, or additionally, in some examples the trial fingerprint sensor system parameters may include range gate delay (RGD) parameters. The RGD parameters may correspond to a time delay before a sampling time interval, such as a time delay between a time interval for transmission of ultrasonic waves and a sampling time interval. According to some such examples, the trial fingerprint sensor system parameters may include multiple RGDs ranging from 0.6 microseconds to 1.8 microseconds. In some examples, there may be on the order of 10 trial fingerprint sensor system parameters or parameter sets, for example 6 trial fingerprint sensor system parameters or parameter sets, 8 trial fingerprint sensor system parameters or parameter sets, 10 trial fingerprint sensor system parameters or parameter sets, 12 trial fingerprint sensor system parameters or parameter sets, 14 trial fingerprint sensor system parameters or parameter sets, etc. Varying the RGD parameters can compensate for variations in protective film thickness and variations in the velocity of sound in different types of protective film. Accordingly, in some examples block 205 may involve controlling, by the control system, the fingerprint sensor system to scan a portion of a user's digit using a plurality of frequency parameters (such as a plurality of peak frequencies), a plurality of RGD parameters (such as a plurality of time delays before a sampling time interval), or combinations thereof. Alternative examples may involve controlling the fingerprint sensor system to scan a portion of a user's digit using a plurality of one or more other trial fingerprint sensor system parameters.

In some examples, method 200 may involve controlling the fingerprint sensor system to obtain one or more "air images," which also may be referred to herein as "background images." One or more such background images may be obtained while no object is on, or proximate, a fingerprint sensor area of the apparatus. The background image(s) may be used for noise cancellation, such as by subtracting background image data from fingerprint image data obtained while a digit is positioned on the fingerprint sensor area of the apparatus. According to some examples, the background image(s) may be obtained prior to the operations of block 210, or prior to the operations of blocks 205 and 210.

In some examples, some or all blocks of method 200 may be performed responsive to fingerprint sensor system performance that is at or below a fingerprint sensor system performance threshold. According to some examples, the fingerprint sensor system performance threshold may correspond to a false rejection rate threshold. Alternatively, or additionally, in some examples the fingerprint sensor system performance threshold may correspond to an image quality threshold, a signal-to-noise ratio threshold, or combinations thereof.

According to some examples, the control system may be configured to scan the portion of the user's digit using the plurality of trial fingerprint sensor system parameters responsive to unsatisfactory fingerprint sensor system performance using fingerprint sensor system parameters of an existing fingerprint sensor system parameter data structure. For example, the existing fingerprint sensor system parameter data structure may include the fingerprint sensor system parameters that were most recently used for controlling the fingerprint sensor system. In some examples, the control system may be configured to scan the portion of the user's digit using the plurality of trial fingerprint sensor system parameters responsive to unsatisfactory fingerprint sensor system performance using fingerprint sensor system parameters of multiple existing fingerprint sensor system parameter data structures, which may in some instances include all existing fingerprint sensor system parameter data structures.

In some examples, some or all blocks of method 200 may be performed responsive to user input. According to some examples in which the apparatus includes a display system, the user input may be received via a graphical user interface (GUI) presented on the display system. According to some examples, the control system may be configured to present the GUI responsive to fingerprint sensor system performance that is at or below a fingerprint sensor system performance threshold. In some examples, the GUI may correspond to an apparatus settings application.

Method 200 may involve obtaining fingerprint image data from the fingerprint sensor system corresponding to the scans of block 205. According to some such examples, method 200 may involve evaluating the obtained fingerprint image data according to one or more image quality metrics. In some examples, the image quality metrics may be based, at least in part, on contrast, on the signal-to-noise ratio, on the mean and/or the standard deviation of the signal amplitude, on the skewness of the signal, on the kurtosis of the signal, or combinations thereof.

In this example, block 210 involves selecting, by the control system and from among the trial fingerprint sensor system parameters, one or more personalized fingerprint sensor system parameters for inclusion in a set of personalized fingerprint sensor system parameters. According to some such examples, block 210 may involve selecting the one or more personalized fingerprint sensor system parameters based, at least in part, on one or more image quality metrics of fingerprint image data obtained using the trial fingerprint sensor system parameters, such as signal-to-noise ratio, one or more of the other examples of image quality metrics noted herein, or combinations thereof. In some examples, the one or more personalized fingerprint sensor system parameters may include a peak frequency, a range gate delay, or both a peak frequency and a range gate delay.

In some examples, it may be desirable to obtain additional fingerprint sensor system parameters for inclusion in the set of personalized fingerprint sensor system parameters. In some such examples, the trial fingerprint sensor system parameters and one or more corresponding personalized fingerprint sensor system parameters selected for inclusion in a set of personalized fingerprint sensor system parameters, may not include a complete set of desirable fingerprint sensor system parameters. For example, the trial fingerprint sensor system parameters may include an RGD parameter, but not a frequency parameter. In some other examples, the trial fingerprint sensor system parameters may include RGD and frequency parameters, but not a bias voltage parameter.

According to some examples, additional fingerprint sensor system parameters for inclusion in the set of personalized fingerprint sensor system parameters may be obtained from an existing fingerprint sensor system parameter data structure that includes a set of existing fingerprint sensor system parameters. In some such examples, the existing fingerprint sensor system parameter data structure may correspond to a particular protective film type, a particular protective film thickness, or a combination thereof.

According to this example, block 215 involves selecting, by the control system and based on the one or more personalized fingerprint sensor system parameters, an existing fingerprint sensor system parameter data structure that includes a set of existing fingerprint sensor system parameters. According to some examples, an existing fingerprint sensor system parameter data structure may be selected that includes one or more existing fingerprint sensor system parameters that are similar to the one or more personalized fingerprint sensor system parameters selected in block 210. According to some such examples, an existing fingerprint sensor system parameter data structure may be selected that includes one or more existing fingerprint sensor system parameters that are the most similar to one or more personalized fingerprint sensor system parameters selected in block 210.

In some examples, an existing fingerprint sensor system parameter data structure may be selected according to a "minimum distance" metric, which may indicate how similar one or more existing fingerprint sensor system parameters are to one or more personalized fingerprint sensor system parameters selected in block 210. In one simple example, if only a single fingerprint sensor system parameter type is selected in block 210, the existing fingerprint sensor system parameter data structure having the closest fingerprint sensor system parameter value for that fingerprint sensor system parameter type may be selected. For example, if only an RGD value is selected in block 210, the existing fingerprint sensor system parameter data structure having the closest RGD value may be selected.

In another example, if values for two fingerprint sensor system parameter types are selected in block 210, the existing fingerprint sensor system parameter data structure having the closest fingerprint sensor system parameter values for both fingerprint sensor system parameter types may be selected. For example, a "distance" may be computed between the values for the two fingerprint sensor system parameter types that are selected in block 210 and corresponding fingerprint sensor system parameter values for each of a plurality of existing fingerprint sensor system parameter data structures. In some such examples, an existing fingerprint sensor system parameter data structure corresponding to the smallest distance may be selected. In some such examples, the distance may be calculated according to the following equation:

$$\text{Dist}(LUT) = \text{sqrt}[(A^2(\text{selected\_param1} - \text{param1}(LUT))^2 + B^2(\text{selected\_param2} - \text{param2}(LUT))^2] \qquad \text{Equation 1}$$

In Equation 1, Dist(LUT) represents the distance between two fingerprint sensor system parameter types that are selected in block 210 (according to this example) and two corresponding fingerprint sensor system parameter values in an existing fingerprint sensor system parameter data structure. In Equation 1, selected_param1 and selected_param2 represent values for a first fingerprint sensor system parameter type and a second fingerprint sensor system parameter type that are selected in block 210. For example, if an RGD parameter value and a frequency parameter value are selected in block 210, selected_param1 may correspond to the selected RGD parameter value and selected_param2 may correspond to the selected frequency parameter value, or vice versa. In Equation 1, param1 (LUT) corresponds to the value for the first fingerprint sensor system parameter type in an existing fingerprint sensor system parameter data structure and param2 (LUT) corresponds to the value for the second fingerprint sensor system parameter type in the same existing fingerprint sensor system parameter data structure. For example, param1 (LUT) may correspond to the RGD parameter value in the existing fingerprint sensor system parameter data structure and param2 (LUT) may correspond to the frequency parameter value in the existing fingerprint sensor system parameter data structure. In Equation 1, A and B represent constants that may optionally be used to weight one or both quantities inside the adjacent parentheses (either (selected_param1−param1 (LUT))$^2$, (selected_param2−param2 (LUT))$^2$, or both). In some examples, A and B may equal 1.

In this example, the existing fingerprint sensor system parameter data structure having the smallest value of Dist (LUT) may be selected in block 215. In some alternative examples, block 215 may involve finding the smallest value of Dist(LUT) according to three or more fingerprint sensor system parameter types that are selected in block 210.

In this example, block 220 involves obtaining, by the control system, additional fingerprint sensor system parameters from the set of existing fingerprint sensor system parameters for inclusion in the set of personalized fingerprint sensor system parameters. For example, if an RGD parameter value and a frequency parameter value are selected in block 210, block 220 may involve obtaining at least a bias voltage parameter value from the existing fingerprint sensor system parameter data structure that was selected in block 215. In another example, if only an RGD parameter value was selected in block 210, block 220 may involve obtaining at least a bias voltage parameter value and a frequency parameter value from the existing fingerprint sensor system parameter data structure that was selected in block 215. According to some examples, block 220 may involve obtaining at least a range gate window (RGW) parameter, which corresponds to the time interval after the RGD during which ultrasonic waves are sampled. In some examples, block 220 may involve obtaining at least one phase parameter.

According to this example, block 225 involves storing by the control system, the set of personalized fingerprint sensor system parameters for future scans of the fingerprint sensor system. In some examples, the set of personalized fingerprint sensor system parameters may be used for future scans of the fingerprint sensor system until the fingerprint sensor system performance—when using the set of personalized fingerprint sensor system parameters—is at or below a fingerprint sensor system performance threshold. The fingerprint sensor system performance threshold may correspond to a false rejection rate threshold, an image quality threshold, or combinations thereof. In some such implementations, the operations of method 200 may be repeated and a new set of personalized fingerprint sensor system parameters may be determined.

Figure 3:
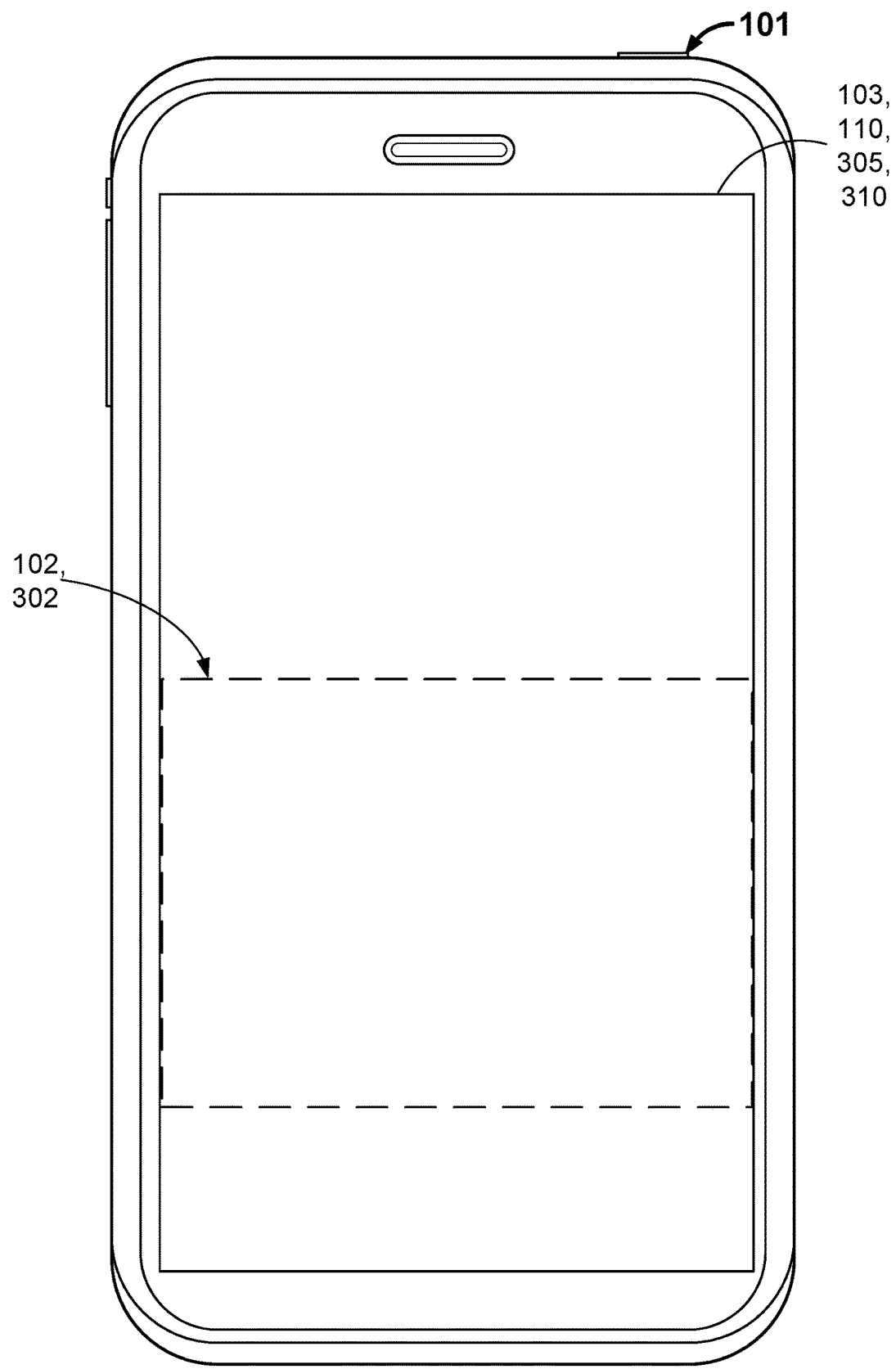
FIG. 3 shows an example of an apparatus configured to perform at least some disclosed methods.

FIG. 3 shows an example of an apparatus configured to perform at least some disclosed methods. As with other disclosed examples, the types, numbers and arrangements of elements that are shown in FIG. 3 are merely presented by way of example. Other examples may include different types of elements, numbers of elements, arrangements of elements, or combinations thereof.

In this example, the apparatus 101 is an instance of the apparatus 101 of FIG. 1. In this implementation, the apparatus 101 is a mobile device that includes a fingerprint sensor system 102, a control system 106 (not shown in FIG. 3) and a display system 110. The fingerprint sensor system 102 may be, or may include, an ultrasonic fingerprint sensor, an optical fingerprint sensor, or another type of fingerprint sensor. The mobile device may, for example, be a cell phone.

According to this example, an active area 302 of the fingerprint sensor system 102 is outlined in large dashes. The active area 302 may, for example, be an area that includes an array of fingerprint sensor pixels of the fingerprint sensor system 102. The array of fingerprint sensor pixels may include receiver pixels, transceiver pixels, etc., depending on the type of fingerprint sensor and the particular implementation. According to this example, the active area 302 corresponds with less than half of the display area 310 of the display system 110. In alternative implementations, the active area 302 may correspond with a larger portion or a smaller portion of the display area 310.

In this example, the active area of the touch sensor system 103 is coextensive with the display area 310. According to this example, a cover stack 305 resides on the active area of the touch sensor system 103 and the display area 310. In this example, the cover stack 305 includes a cover glass and at least one protective film layer. According to this example, the active area 302 of the fingerprint sensor system 102 resides below the cover stack 305, the display area 310 and the active area of the touch sensor system 103. In other words, the display area 310 and the active area of the touch sensor system 103 reside between the active area of the touch sensor system 103 and the cover stack 305.

Figure 4:
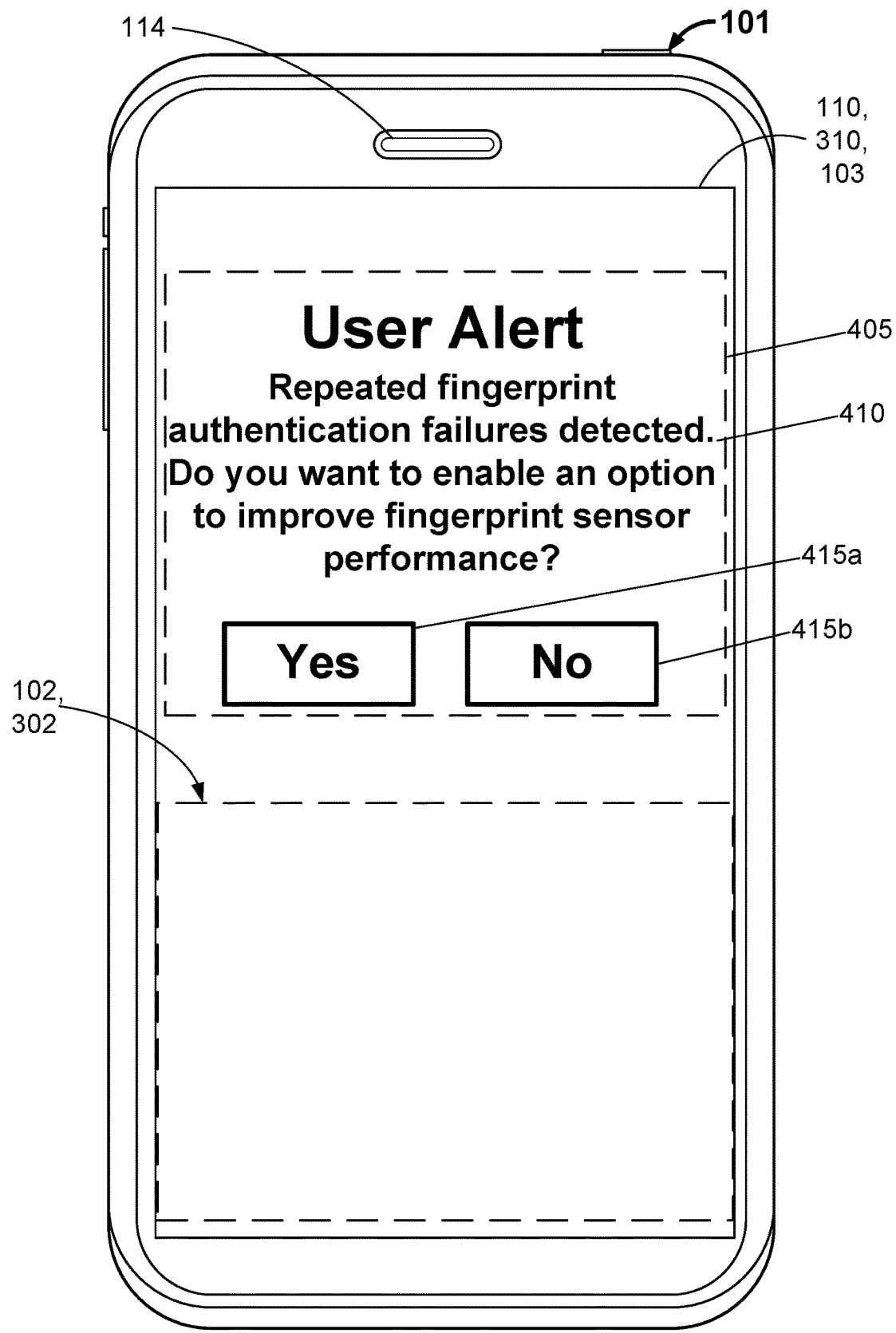
FIG. 4 shows an example of a graphical user interface (GUI) that may be provided according to some disclosed methods.

FIG. 4 shows an example of a graphical user interface (GUI) that may be provided according to some disclosed methods. As with other disclosed examples, the types, numbers and arrangements of elements that are shown in FIG. 4 are merely presented by way of example. Other examples may include different types of elements, numbers of elements, arrangements of elements, or combinations thereof.

In this example, the apparatus 101 is an instance of the apparatus 101 of FIG. 1 and includes the elements that are described with reference to FIG. 3. According to this example, a control system (not shown) of the apparatus 101 is controlling the display system 110 to present a GUI 405. According to this example, the control system is configured to present the GUI 405—or a similar GUI—responsive to one or more indications that the fingerprint sensor system performance is at or below a fingerprint sensor system performance threshold, such as a threshold number of failed authentication attempts, a false rejection rate threshold, an image quality threshold, or combinations thereof.

According to this example, the GUI 405 includes a textual portion 410 and virtual buttons 415a and 415b. Here, the textual portion 410 indicates that repeated fingerprint authentication failures have been detected and asks whether the user wants to enable an option to improve fingerprint sensor performance. In some examples, the control system may be configured to control the loudspeaker system 114 to provide one or more audio messages, which may correspond with the text of the textual portion 410. A user may provide a response to the textual portion 410, an audio prompt or a combination thereof by touching the virtual button 415a or the virtual button 415b. In some examples, a user may provide a response via a voice command received by the microphone system 112 (not shown).

Figure 5C:
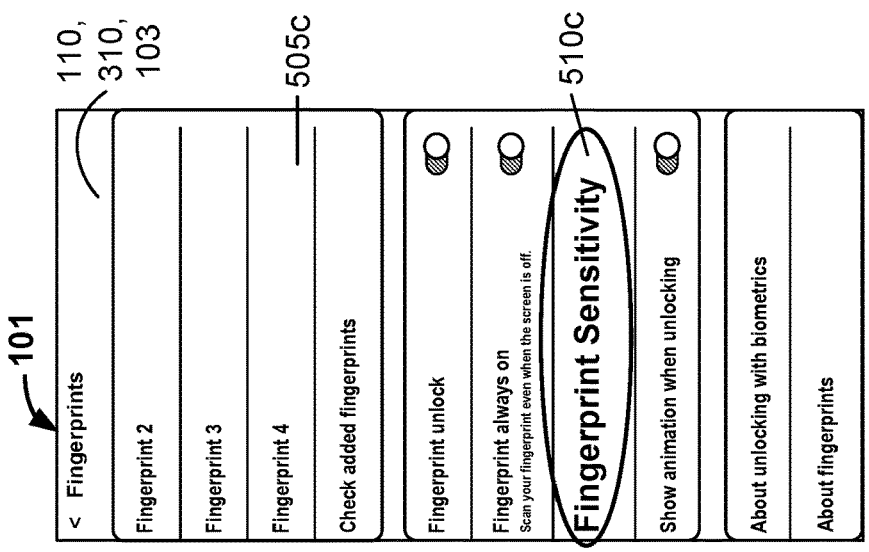
FIGS. 5A, 5B and 5C show examples of additional GUIs that may be provided according to some disclosed methods.
Figure 5B:
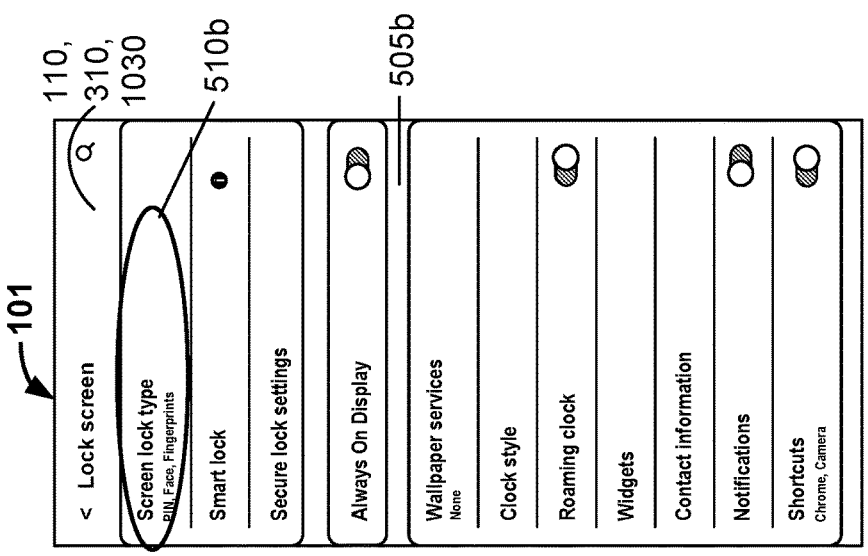
Figure 5A:
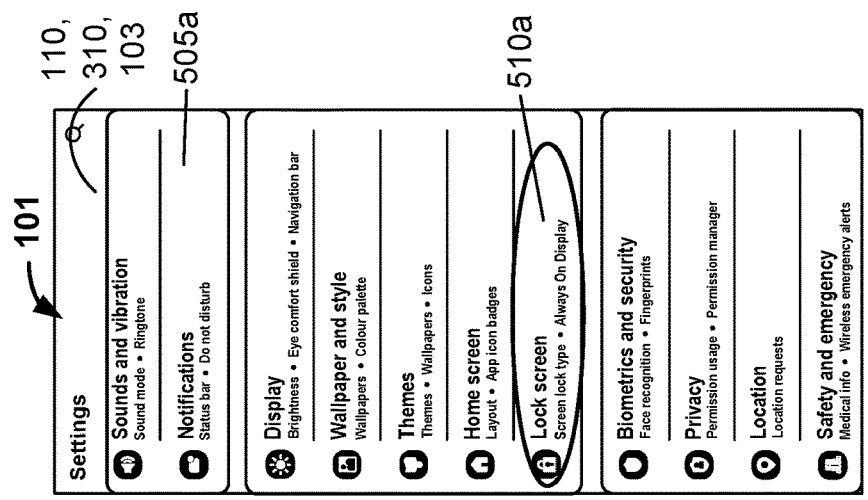

FIGS. 5A, 5B and 5C show examples of additional GUIs that may be provided according to some disclosed methods. As with other disclosed examples, the types, numbers and arrangements of elements that are shown in FIGS. 5A, 5B and 5C are merely presented by way of example. Other examples may include different types of elements, numbers of elements, arrangements of elements, or combinations thereof.

In these examples, the apparatus 101 is an instance of the apparatus 101 of FIG. 1 and includes the elements that are described with reference to FIG. 3. According to these examples, a control system (not shown) of the apparatus 101 is controlling the display system 110 to present the GUIs 505a, 505b and 505c.

The GUI 505a shown in FIG. 5A is an example of a GUI that may be presented responsive to activating a "settings" software application or "app." For example, the GUI 505a, or a similar GUI, may be presented responsive to receiving an indication from the touch sensor system 103 of a touch in the area of an icon corresponding to a settings app. According to this example, the control system is configured to cause the display system 110 to present one or more additional GUIs responsive to a user's interaction with the GUI 505a.

In this example, the control system is configured to cause the display system 110 to present the GUI 505b responsive to receiving an indication from the touch sensor system 103 of a touch in the area 510a of the GUI 505a, which corresponds to lock screen features and functionality. The GUI 505b includes various areas corresponding multiple types of lock screen features and functionality. In this example, the area 510b of the GUI 505b corresponds to screen lock type.

According to some examples, the control system is configured to cause the display system 110 to present the GUI 505c responsive to receiving an indication from the touch sensor system 103 of a touch in the area 510b of the GUI 505b. In other examples, an additional GUI may be presented responsive to receiving an indication from the touch sensor system 103 of a touch in the area 510*b* of the GUI 505*b*, after which the GUI 505*c* may or may not be presented, depending on a user's selection. For example, responsive to receiving an indication from the touch sensor system 103 of a touch in the area 510*b* of the GUI 505*b*, a GUI may be presented that allows a user to select between unlocking the apparatus 101 via fingerprint authentication and unlocking the apparatus 101 via another method, such as facial recognition, entry of an identification code, etc. In some such examples, a control system may be configured to present the GUI 505*c* responsive to receiving an indication from the touch sensor system 103 of a touch in an area corresponding to unlocking the apparatus 101 via fingerprint authentication. According to some examples, the control system may be configured to present the GUI 505*c*—or a similar GUI—responsive to receiving an indication from the touch sensor system 103 of a touch in the area of the virtual button 415*a* of FIG. 4.

According to this example, the GUI 505*c* includes various areas corresponding to fingerprint authentication. In this example, the GUI 505*c* includes an area 510*c* corresponding to fingerprint sensitivity. In some examples, the control system may be configured to enable the method 200, or a similar method, responsive to receiving an indication from the touch sensor system 103 of a touch in the area 510*c*.

FIGS. 6A, 6B, 6C and 6D show examples of additional GUIs that may be provided according to some disclosed methods. As with other disclosed examples, the types, numbers and arrangements of elements that are shown in FIGS. 6A, 6B, 6C and 6D are merely presented by way of example. Other examples may include different types of elements, numbers of elements, arrangements of elements, or combinations thereof.

In these examples, the apparatus 101 is an instance of the apparatus 101 of FIG. 1 and includes the elements that are described with reference to FIG. 3. According to these examples, a control system (not shown) of the apparatus 101 is controlling the display system 110 to present the GUIs 605*a*, 605*b*, 605*c* and 605*d*.

Figure 6A:
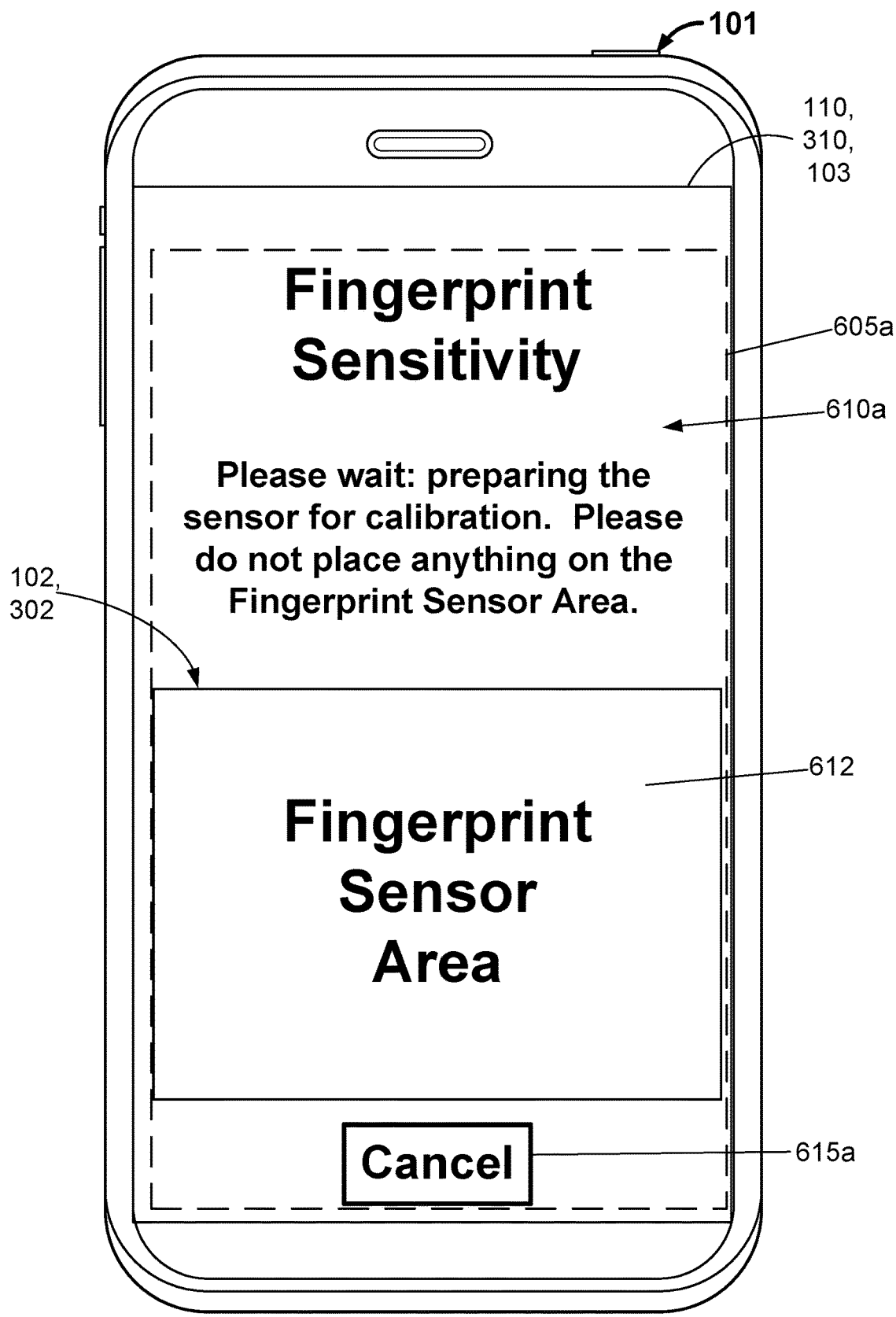
FIGS. 6A, 6B, 6C and 6D show examples of additional GUIs that may be provided according to some disclosed methods.

The GUI 605*a* shown in FIG. 6A is an example of a GUI that may be presented responsive to receiving an indication from the touch sensor system 103 of a touch in the area 510*c* of the GUI 505*c* shown in FIG. 5C. According to this example, the GUI 605*a* includes a textual portion 610*a*, a fingerprint sensor area indication 612 and a virtual button 615*a*. Here, the textual portion 610*a* indicates that the fingerprint sensor is being prepared for calibration and that the user should not place anything in the fingerprint sensor area 302. In some examples, the control system may be configured to control the loudspeaker system 114 to provide one or more audio messages, which may correspond with the text of the textual portion 610*a*. In this example, a user may cancel the calibration process by touching the virtual button 615*a*. In some examples, a user may provide a response via a voice command received by the microphone system 112 (not shown).

In this example, at the time that the GUI 605*a* is being presented, the control system is configured to control the fingerprint sensor system to obtain one or more air images, also referred to herein as background images. Such background images should be obtained while no object is on, or proximate, a fingerprint sensor area of the apparatus. This is the reason underlying the message provided by the textual portion 610*a*. According to some examples, the background image(s) may be obtained prior to the operations of block 210 of FIG. 2, or prior to the operations of blocks 205 and 210.

Figure 6B:
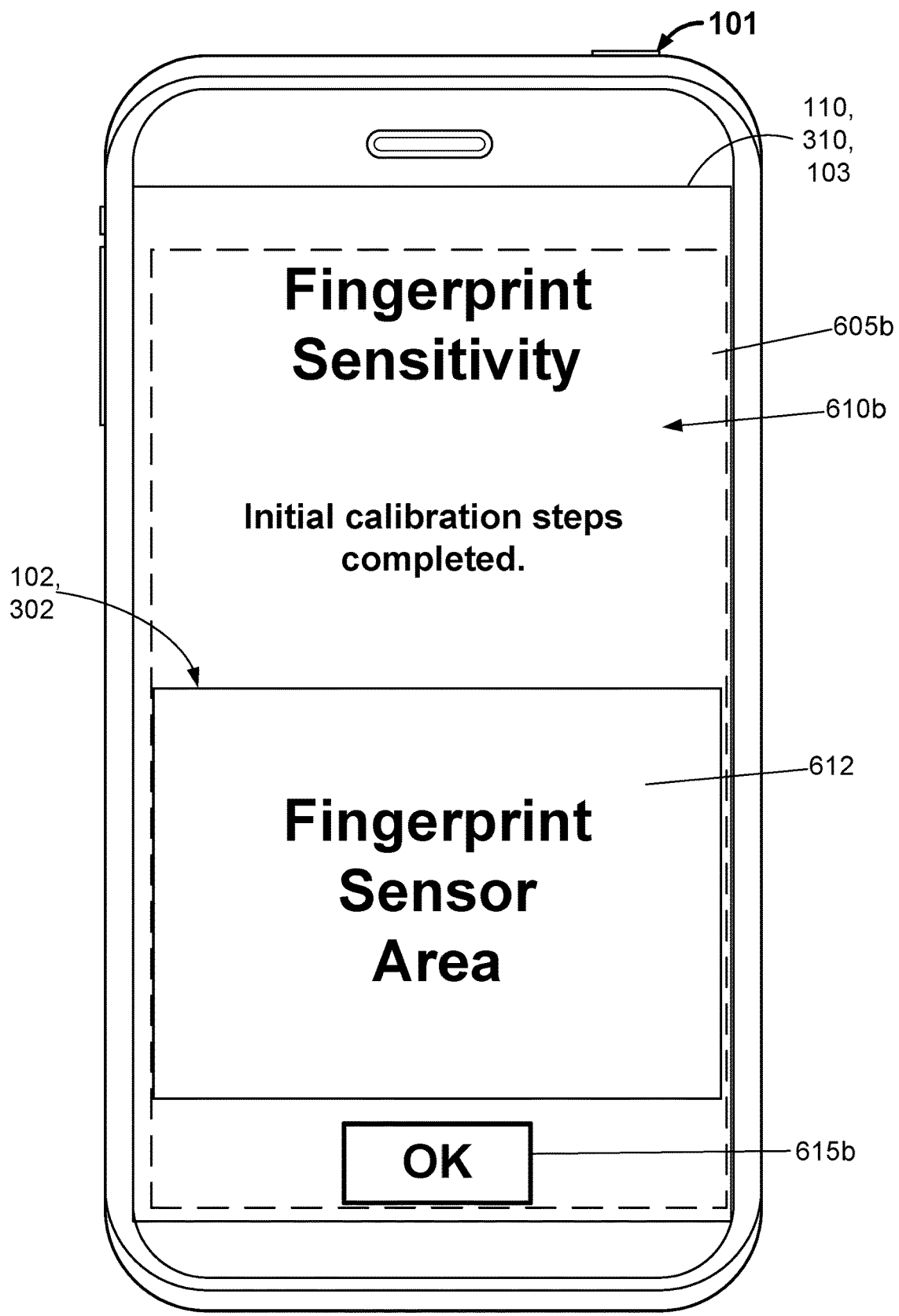

The GUI 605*b* shown in FIG. 6B is an example of a GUI that may be presented after one or more background images have been obtained. According to this example, the GUI 605*b* includes a textual portion 610*b*, a fingerprint sensor area indication 612 and a virtual button 615*b*. Here, the textual portion 610*b* indicates that the initial calibration steps have been completed. In some examples, the control system may be configured to control the loudspeaker system 114 to provide one or more audio messages, which may correspond with the text of the textual portion 610*b*. In some examples, a user may provide a response via a voice command received by the microphone system 112 (not shown).

Figure 6C:
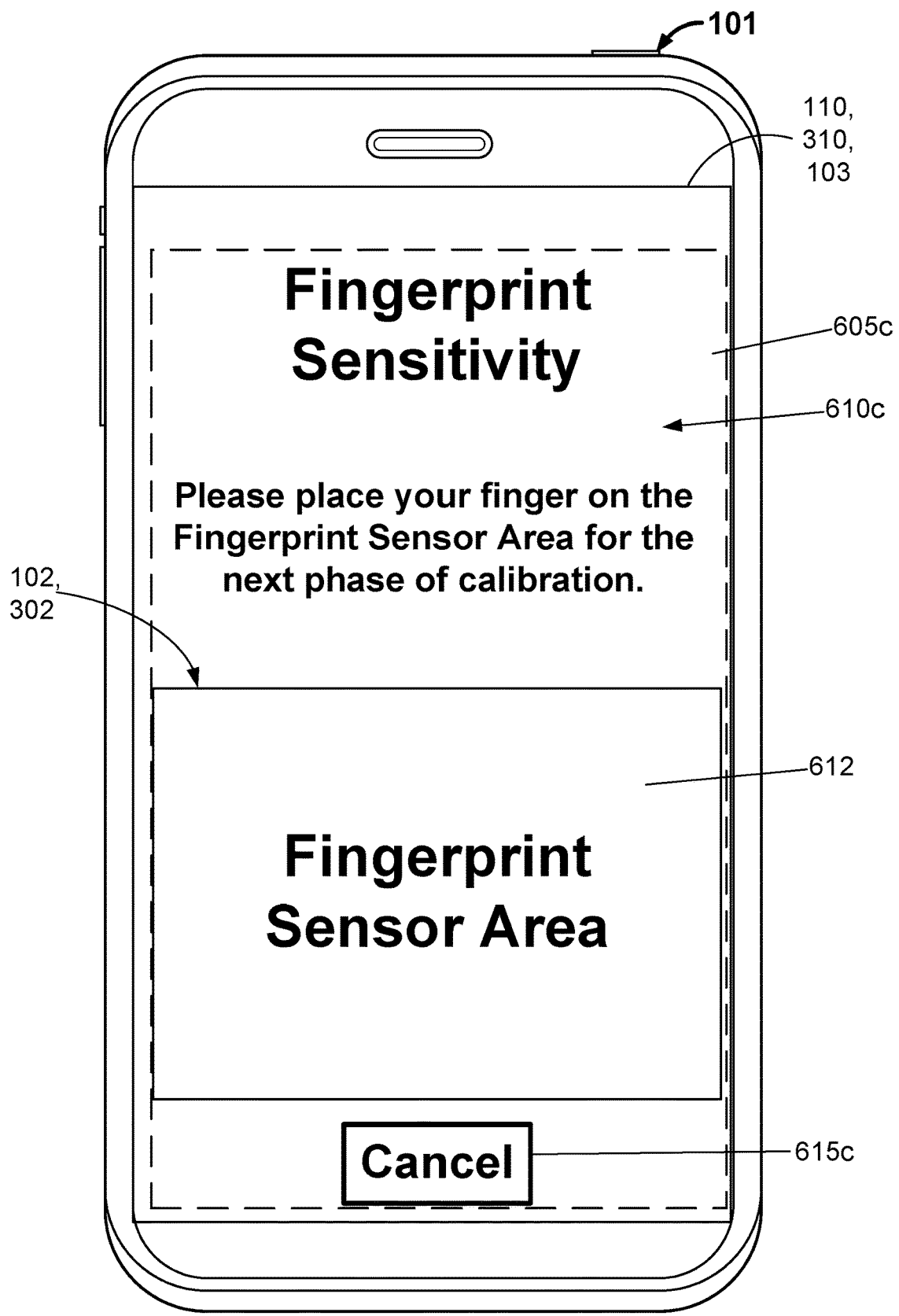

In this example, responsive to receiving an indication from the touch sensor system 103 of a touch in the area the virtual button 615*a* of FIG. 6B, the control system is configured to cause the display system 110 to present the GUI 605*c* shown in FIG. 6C. According to this example, the GUI 605*c* includes a textual portion 610*c*, a fingerprint sensor area indication 612 and a virtual button 615*c*. Here, the textual portion 610*c* includes a textual prompt for the user to place a finger in the fingerprint sensor area for the next phase of calibration. According to some examples, the textual portion 610*c* may include a textual prompt for the user to place a particular digit in the fingerprint sensor area, such as a right thumb, a left index finger, a right middle finger, etc. According to some examples, the textual portion 610*c* may include a textual prompt for the user to place multiple specified digits in the fingerprint sensor area. In some examples, the control system may be configured to control the loudspeaker system 114 to provide one or more audio messages, which may correspond with the text of the textual portion 610*c*. In this example, a user may cancel the calibration process by touching the virtual button 615*c*. In some examples, a user may provide a response via a voice command received by the microphone system 112 (not shown).

In this example, responsive to receiving an indication (such as an indication from the touch sensor system 103) that the user has placed a digit in the fingerprint sensor area, the control system is configured to cause the fingerprint sensor system 102 to scan at least a portion of the user's digit using a plurality of trial fingerprint sensor system parameters. Accordingly, responsive to receiving the indication that the user has placed the digit in the fingerprint sensor area, the control system is configured to cause the apparatus 101 to perform at least block 205 of FIG. 2. In some examples, responsive to receiving the indication that the user has placed the digit in the fingerprint sensor area, the control system may be configured to cause the apparatus 101 to perform all of the blocks of FIG. 2. In some examples, responsive to receiving the indication that the user has placed the digit in the fingerprint sensor area, the control system may be configured to cause the apparatus 101 to perform all of the blocks of FIG. 2 and one or more additional aspects of the method 200 that are disclosed herein.

Figure 6D:
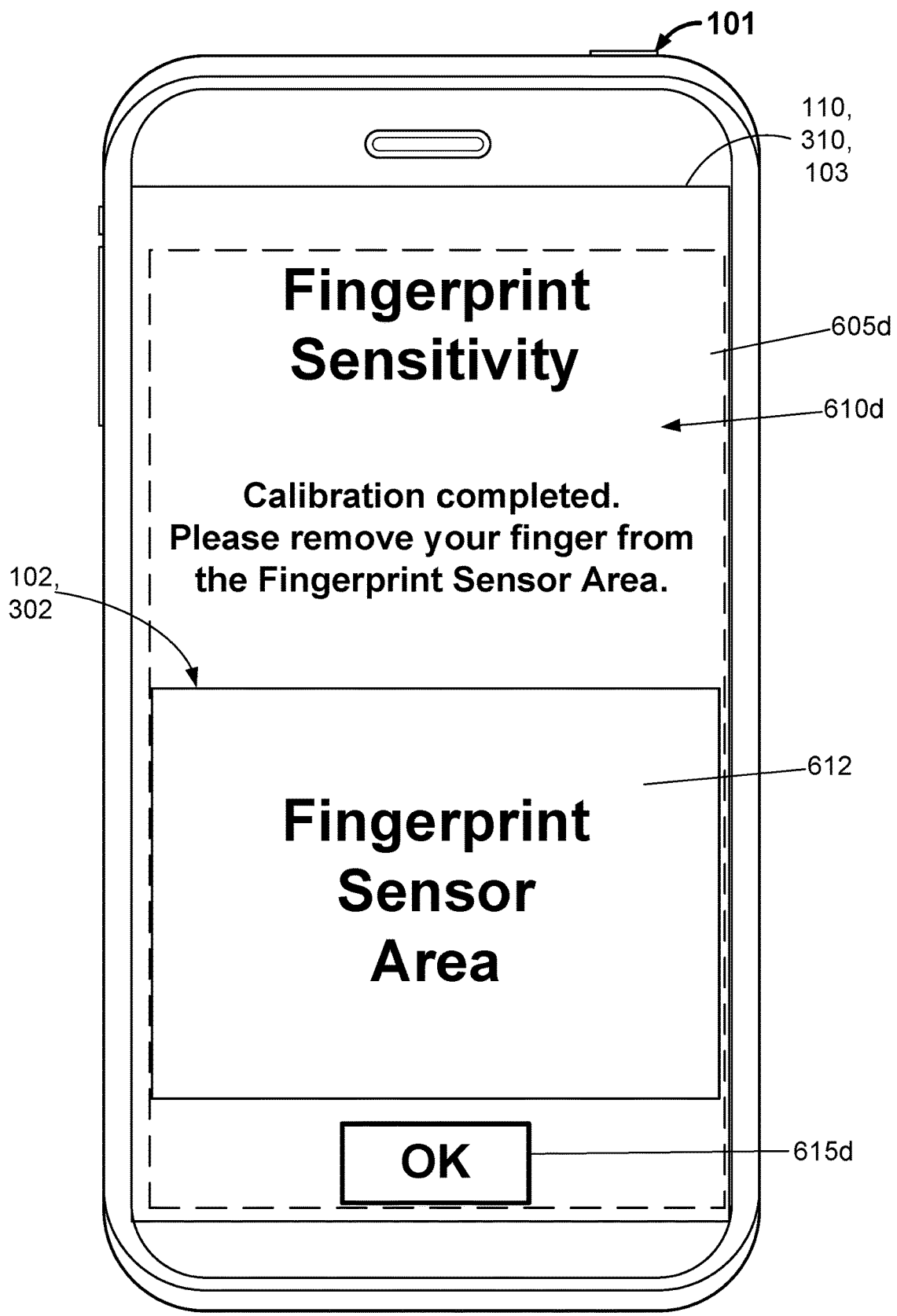

The GUI 605*d* shown in FIG. 6D is an example of a GUI that may be presented after the phase(s) of calibration indicated in the GUI 605*c* have been completed. In some examples, the GUI 605*d* may be presented after all of the blocks shown in FIG. 2 have been completed. According to some examples, the GUI 605*d* may be presented after all of the blocks shown in FIG. 2 and one or more additional processes of the method 200 have been completed. According to this example, the GUI 605d includes a textual portion 610d, a fingerprint sensor area indication 612 and a virtual button 615d. Here, the textual portion 610d indicates that the calibration process has been completed and that the user may remove the digit from the fingerprint sensor area. In some examples, the control system may be configured to control the loudspeaker system 114 to provide one or more audio messages, which may correspond with the text of the textual portion 610d. In some examples, a user may provide a response via a voice command received by the microphone system 112 (not shown).

Implementation examples are described in the following numbered clauses:

1. An apparatus, including: a fingerprint sensor system; and a control system configured for communication with the fingerprint sensor system, the control system being further configured to: control the fingerprint sensor system to scan a portion of a user's digit on a surface of the apparatus using a plurality of trial fingerprint sensor system parameters; select, from among the trial fingerprint sensor system parameters, one or more personalized fingerprint sensor system parameters for inclusion in a set of personalized fingerprint sensor system parameters; select, based on the one or more personalized fingerprint sensor system parameters, an existing fingerprint sensor system parameter data structure that includes a set of existing fingerprint sensor system parameters; obtain additional fingerprint sensor system parameters from the set of existing fingerprint sensor system parameters for inclusion in the set of personalized fingerprint sensor system parameters; and store the set of personalized fingerprint sensor system parameters for future scans of the fingerprint sensor system.

2. The apparatus of clause 1, where the control system is configured to scan the portion of the user's digit using the plurality of trial fingerprint sensor system parameters responsive to fingerprint sensor system performance that is at or below a fingerprint sensor system performance threshold.

3. The apparatus of clause 2, where the fingerprint sensor system performance threshold corresponds to a false rejection rate threshold.

4. The apparatus of clause 2, where the fingerprint sensor system performance threshold corresponds to an image quality threshold or a signal-to-noise ratio threshold.

5. The apparatus of any one of clauses 1-4, where the control system is configured to scan the portion of the user's digit using the plurality of trial fingerprint sensor system parameters responsive to user input.

6. The apparatus of clause 5, further including a display system, where the user input is received via a graphical user interface (GUI) presented on the display system.

7. The apparatus of clause 6, where the control system is further configured to present the GUI responsive to fingerprint sensor system performance that is at or below a fingerprint sensor system performance threshold.

8. The apparatus of clause 6, where the GUI corresponds to an apparatus settings application.

9. The apparatus of any one of clauses 1-8, where the control system is configured to scan the portion of the user's digit using the plurality of trial fingerprint sensor system parameters responsive to unsatisfactory fingerprint sensor system performance using fingerprint sensor system parameters of the existing fingerprint sensor system parameter data structure.

10. The apparatus of any one of clauses 1-9, where the control system is configured to scan the portion of the user's digit using the plurality of trial fingerprint sensor system parameters responsive to unsatisfactory fingerprint sensor system performance using fingerprint sensor system parameters of a plurality of existing fingerprint sensor system parameter data structures.

11. The apparatus of any one of clauses 1-10, where the one or more personalized fingerprint sensor system parameters include a peak frequency, a range gate delay, or both the peak frequency and the range gate delay.

12. The apparatus of any one of clauses 1-11, where the control system is configured to select the one or more personalized fingerprint sensor system parameters based, at least in part, on image quality, signal-to-noise ratio, or a combination thereof 13. The apparatus of any one of clauses 1-12, where the existing fingerprint sensor system parameter data structure is selected from a plurality of existing fingerprint sensor system parameter data structures.

14. The apparatus of clause 13, where the existing fingerprint sensor system parameter data structure is selected from the plurality of existing fingerprint sensor system parameter data structures according to a distance between the one or more personalized fingerprint sensor system parameters and one or more corresponding fingerprint sensor system parameters of each existing fingerprint sensor system parameter data structure of the plurality of existing fingerprint sensor system parameter data structures.

15. The apparatus of any one of clauses 1-14, where the control system is configured to obtain one or more background images prior to selecting the one or more personalized fingerprint sensor system parameters.

16. A method, including: controlling, by a control system, a fingerprint sensor system to scan a portion of a user's digit on a surface of an apparatus using a plurality of trial fingerprint sensor system parameters; selecting, by the control system and from among the trial fingerprint sensor system parameters, one or more personalized fingerprint sensor system parameters for inclusion in a set of personalized fingerprint sensor system parameters; selecting, by the control system and based on the one or more personalized fingerprint sensor system parameters, an existing fingerprint sensor system parameter data structure that includes a set of existing fingerprint sensor system parameters; obtaining, by the control system, additional fingerprint sensor system parameters from the set of existing fingerprint sensor system parameters for inclusion in the set of personalized fingerprint sensor system parameters; and storing by the control system, the set of personalized fingerprint sensor system parameters for future scans of the fingerprint sensor system.

17. The method of clause 16, further including scanning the portion of the user's digit using the plurality of trial fingerprint sensor system parameters responsive to fingerprint sensor system performance that is at or below a fingerprint sensor system performance threshold.

18. The method of clause 17, where the fingerprint sensor system performance threshold corresponds to a false rejection rate threshold.

19. The method of clause 17, where the fingerprint sensor system performance threshold corresponds to an image quality threshold or a signal-to-noise ratio threshold.

20. An apparatus, including: a fingerprint sensor system; and control means for: controlling the fingerprint sensor system to scan a portion of a user's digit on a surface of the apparatus using a plurality of trial fingerprint sensor system parameters; selecting, from among the trial fingerprint sensor system parameters, one or more personalized fingerprint sensor system parameters for inclusion in a set of personalized fingerprint sensor system parameters; selecting, based on the one or more personalized fingerprint sensor system parameters, an existing fingerprint sensor system parameter data structure that includes a set of existing fingerprint sensor system parameters; obtaining additional fingerprint sensor system parameters from the set of existing fingerprint sensor system parameters for inclusion in the set of personalized fingerprint sensor system parameters; and storing the set of personalized fingerprint sensor system parameters for future scans of the fingerprint sensor system.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus, comprising:
    a fingerprint sensor system; and
    a control system configured for communication with the fingerprint sensor system, the control system being further configured to:
        control the fingerprint sensor system to scan a portion of a user's digit on a surface of the apparatus using a plurality of trial fingerprint sensor system parameters;
        select, from among the trial fingerprint sensor system parameters, one or more personalized fingerprint sensor system parameters for inclusion in a set of personalized fingerprint sensor system parameters;
        select, based on the one or more personalized fingerprint sensor system parameters, an existing fingerprint sensor system parameter data structure that includes a set of existing fingerprint sensor system parameters;
        obtain additional fingerprint sensor system parameters from the set of existing fingerprint sensor system parameters for inclusion in the set of personalized fingerprint sensor system parameters; and
        store the set of personalized fingerprint sensor system parameters for future scans of the fingerprint sensor system.

2. The apparatus of claim 1, wherein the control system is configured to scan the portion of the user's digit using the plurality of trial fingerprint sensor system parameters responsive to fingerprint sensor system performance that is at or below a fingerprint sensor system performance threshold.

3. The apparatus of claim 2, wherein the fingerprint sensor system performance threshold corresponds to a false rejection rate threshold.

4. The apparatus of claim 2, wherein the fingerprint sensor system performance threshold corresponds to an image quality threshold or a signal-to-noise ratio threshold.

5. The apparatus of claim 1, wherein the control system is configured to scan the portion of the user's digit using the plurality of trial fingerprint sensor system parameters responsive to user input.

6. The apparatus of claim 5, further comprising a display system, wherein the user input is received via a graphical user interface (GUI) presented on the display system.

7. The apparatus of claim 6, wherein the control system is further configured to present the GUI responsive to fingerprint sensor system performance that is at or below a fingerprint sensor system performance threshold.

8. The apparatus of claim 6, wherein the GUI corresponds to an apparatus settings application.

9. The apparatus of claim 1, wherein the control system is configured to scan the portion of the user's digit using the plurality of trial fingerprint sensor system parameters responsive to unsatisfactory fingerprint sensor system performance using fingerprint sensor system parameters of the existing fingerprint sensor system parameter data structure.

10. The apparatus of claim 1, wherein the control system is configured to scan the portion of the user's digit using the plurality of trial fingerprint sensor system parameters responsive to unsatisfactory fingerprint sensor system performance using fingerprint sensor system parameters of a plurality of existing fingerprint sensor system parameter data structures.

11. The apparatus of claim 1, wherein the one or more personalized fingerprint sensor system parameters include a peak frequency, a range gate delay, or both the peak frequency and the range gate delay.

12. The apparatus of claim 1, wherein the control system is configured to select the one or more personalized fingerprint sensor system parameters based, at least in part, on image quality, signal-to-noise ratio, or a combination thereof.

13. The apparatus of claim 1, wherein the existing fingerprint sensor system parameter data structure is selected from a plurality of existing fingerprint sensor system parameter data structures.

14. The apparatus of claim 13, wherein the existing fingerprint sensor system parameter data structure is selected from the plurality of existing fingerprint sensor system parameter data structures according to a distance between the one or more personalized fingerprint sensor system parameters and one or more corresponding fingerprint sensor system parameters of each existing fingerprint sensor system parameter data structure of the plurality of existing fingerprint sensor system parameter data structures.

15. The apparatus of claim 1, wherein the control system is configured to obtain one or more background images prior to selecting the one or more personalized fingerprint sensor system parameters.

16. A method, comprising:
    controlling, by a control system, a fingerprint sensor system to scan a portion of a user's digit on a surface of an apparatus using a plurality of trial fingerprint sensor system parameters;
    selecting, by the control system and from among the trial fingerprint sensor system parameters, one or more personalized fingerprint sensor system parameters for inclusion in a set of personalized fingerprint sensor system parameters;
    selecting, by the control system and based on the one or more personalized fingerprint sensor system parameters, an existing fingerprint sensor system parameter data structure that includes a set of existing fingerprint sensor system parameters;
    obtaining, by the control system, additional fingerprint sensor system parameters from the set of existing fingerprint sensor system parameters for inclusion in the set of personalized fingerprint sensor system parameters; and
    storing by the control system, the set of personalized fingerprint sensor system parameters for future scans of the fingerprint sensor system.

17. The method of claim 16, further comprising scanning the portion of the user's digit using the plurality of trial fingerprint sensor system parameters responsive to fingerprint sensor system performance that is at or below a fingerprint sensor system performance threshold.

18. The method of claim 17, wherein the fingerprint sensor system performance threshold corresponds to a false rejection rate threshold.

19. The method of claim 17, wherein the fingerprint sensor system performance threshold corresponds to an image quality threshold or a signal-to-noise ratio threshold.

20. An apparatus, comprising:
a fingerprint sensor system; and
control means for:
- controlling the fingerprint sensor system to scan a portion of a user's digit on a surface of the apparatus using a plurality of trial fingerprint sensor system parameters;
- selecting, from among the trial fingerprint sensor system parameters, one or more personalized fingerprint sensor system parameters for inclusion in a set of personalized fingerprint sensor system parameters;
- selecting, based on the one or more personalized fingerprint sensor system parameters, an existing fingerprint sensor system parameter data structure that includes a set of existing fingerprint sensor system parameters;
- obtaining additional fingerprint sensor system parameters from the set of existing fingerprint sensor system parameters for inclusion in the set of personalized fingerprint sensor system parameters; and
- storing the set of personalized fingerprint sensor system parameters for future scans of the fingerprint sensor system.

* * * * *